Feb. 9, 1960
H. MAROLDT
2,924,108
V-BELT PULLEYS
Filed Feb. 5, 1958
FIG. 1   FIG. 2
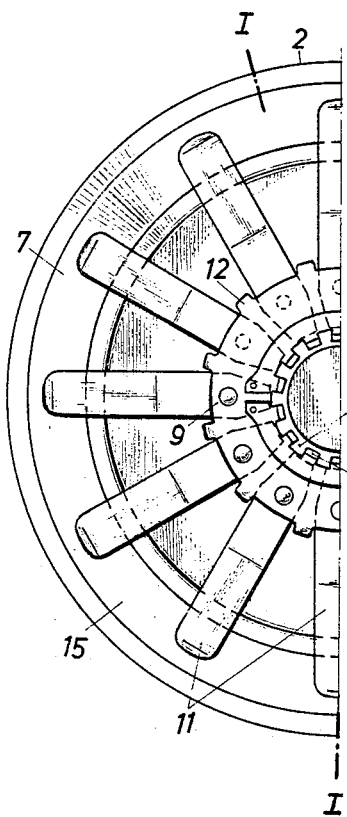
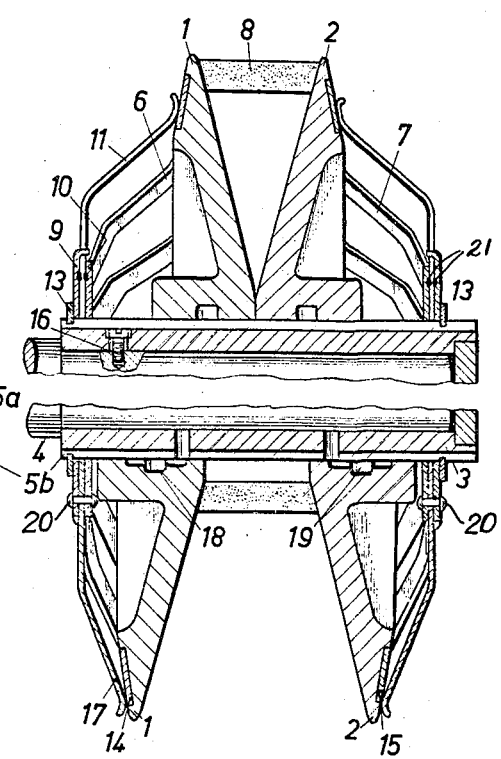
FIG. 3
Inventor:
HEINZ MAROLDT
By Toulmin & Toulmin
Attorneys

United States Patent Office 2,924,108
Patented Feb. 9, 1960

2,924,108

V-BELT PULLEYS

Heinz Maroldt, Hameln, Germany, assignor to Maschinenfabrik Stahlkontor Weser G.m.b.H., Hameln, Germany Application February 5, 1958, Serial No. 713,346

Claims priority, application Germany February 6, 1957

3 Claims. (Cl. 74—230.17)

The present invention relates to V-belt pulleys. More in particular the present invention relates to V-belt pulleys comprising a pair of independently axially moveable conical plates at least one of which is actuated by the resilient action of the radial stems or fingers of a plate spring.

It is known in the art to construct adjustable V-belt pulleys of the indicated type. These known pulleys consist of two conical plates which can be axially moved relative to each other. At least one of these plates is influenced by a plate spring. This plate spring is made of a disk stamped out of a strap of spring steel. The disk is provided with a central opening for mounting the spring on the bearing shaft of the V-belt pulley. Furthermore, radial slots are stamped out of these disks so as to obtain a plurality of radially extending stems or fingers constituting the resilient portions of the plate spring. The entire spring is thus composed out of one single piece punched out of a sufficiently wide strap of spring steel.

Although the V-belt pulleys equipped with these known plate springs may be considered as an improvement over the conventional V-belt pulleys using the generally known plate springs, corrugated plate springs, cup springs, spiral or coil springs, and the like, the construction just described still suffers from a number of important disadvantages.

(1) It has been proved to be impossible to produce straps of spring steel which have an entirely homogeneous elastic tension across their entire width. The plate spring stamped out of this strap of spring steel therefore has differences in tension in its various constitutive portions. As a result, the stems or fingers are subject to a varying load, the plate springs are subject to an uneven distribution of load and, consequently, some of the stems may break.

(2) Since the entire plate spring is punched out of one piece of material the central portion of the plate spring is not sufficiently strong and it is therefore insufficient to support the same by one abutment of the bearing bushing of the V-belt pulley. It is necessary to provide a second abutment at the inner side of the central portion of the plate spring. These abutments consist of elastic rings engaging circumferential grooves of the bush bearing the conical plates forming the V-belt pulley. This calls for a delicate adjustment of the abutments which must have a distance from each other which accurately corresponds to the width of the central portion of the plate springs. Since this width varies and is never entirely even the preparation of the grooves is most difficult.

(3) Since the plate springs are punched out of the strap of spring steel there is a good deal of waste scrap consisting of the punched out portions.

It is an object of the present invention, to provide a plate spring comprising a plurality of resilient radial stems actuating at least one of the pair of axially moveable conical plates of V-belt pulleys in which the tension of the individual stems of the plate spring is very homogeneous and even.

It is another object of the present invention, to provide a plate spring comprising a plurality of resilient radial stems actuating at least one of the pair of axially moveable conical plates of V-belt pulleys, in which the central portion of the plate has a sufficient strength so as to make a second abutment unnecessary.

It is a further object of the present invention, to provide a plate spring comprising a plurality of resilient radial stems actuating at least one of the pair of axially moveable conical plates of V-belt pulleys, which can be produced in a very simple manner, with a minimum of waste and at low cost.

It is yet another object of the present invention, to provide a plate spring comprising a plurality of resilient radial stems actuating at least one of the pair of axially moveable conical plates of V-belt pulleys, in which the strength and resiliency of the stems can be different from the strength of the central portion of the spring.

These objects are achieved by the plate spring of the present invention which is composed of a plurality of separately produced stems and two support rings between which the stems are mounted with their respective bases at a predetermined, equal distance from each other, preferably by a single spot attachment. The stems are separately punched out of band of high quality spring steel, while the support rings are separately punched out of another sheet of steel, which may have a consistency and strength differing from those of the steel from which the stems are obtained.

One of the two support rings may be provided with a plurality of circumferential, equally spaced lugs which are bent towards the second support ring between two neighboring stems, thus centering the stems and securing the stems in their respective equidistantly spaced positions.

The invention will be better understood upon the following detailed description of the accompanying drawings, wherein:

Figure 1 is a plan view of a part of a plate spring of the present invention;

Figure 2 is a cross sectional view of a V-belt pulley with the plate spring of the present invention taken along the lines I—I of Figure 1 and shows the plates of the V-belt pulley at the smallest possible distance from each other;

Figure 3 is a cross sectional view of a V-belt pulley with the plate spring of the present invention taken along the lines I—I of Figure 1 and shows the plates of the V-belt pulley at the greatest possible distance removed from each other.

Referring now to the drawings somewhat more in detail and turning first to Figure 1, the conical shaped disks 1 and 2 supporting the V-belt 8 are positioned upon a bush 3 which, in turn, is fixedly mounted upon a driving shaft, as, for example, the motor shaft 4 by suitable fastening means, as, for example, a wedge, bush 3 and shaft 4 together thus forming a shaft means. At its periphery the bush 3 has a pluarilty of equidistantly spaced protruding portions 5a and intermittent recesses 5b, thus forming a toothed arrangement. The bush 3 is secured against axial displacement by set screws 16. The conical plates 1 and 2 can be displaced in an axial direction but cannot be rotated relative to the bush 3. They are rotated together with the bush 3 revolving upon the shaft 4. There are also provided lubrication grooves 18 and 19 into which the lubricant is pressed by a grease nipple.

On either side of the pair of plates 1 and 2 there are arranged the plate springs 6 and 7 of the present invention which press the plates 1 and 2 against the V-belt 8.

The plate springs 6 and 7 of the invention are not stamped out as one single piece but are assembled from a number of separately produced elements. Each of the plate springs thus comprises two support rings 9 and 10 having a central hole corresponding to the diameter of the bush 3. The plate spring further comprises a plurality of spring strips or stems or fingers 11.

The fingers or stems are individually punched out of a band of spring steel, preferably Swedish steel suitable for watch springs. The width and elasticity of this steel band is adapted to the particular usage and the requirements of the V-belt pulley in which the stems or fingers are used.

The two support rings 9 and 10 are also separately punched out of a strap of steel which may have a width and quality differing from the steel for the stems. It is, for example, advisable to choose a steel sheet which has a somewhat greater width and which is stronger, while being less resilient, than the steel band for producing the stems. One of these two support rings 9 and 10—in the accompanying drawings the support ring 9—has, at its periphery, equidistantly spaced protruding lugs 12 with the intermittent portions between two neighboring lugs being punched out.

The stems 11 are fixed between the two support rings 9 and 10 by single spot attachment as, for example, by rivets 20 (Fig. 3) or by spot welding 21 (Fig. 2). The protruding lugs 12 of the support ring 9 are bent in the direction towards the support ring 10 and the stems or fingers 11 are centered between two neighboring of these bent lugs which thus determine the equal distance between the stems and secure the stems in their centered position until they have been attached to the rings. After the attachment they prevent the stems from being displaced laterally.

The support rings 9 and 10 rest against an abutment formed by the resilient ring 13 engaging with its inner portion the grooves on the periphery of the bush 5. There is no second abutment.

The plates 1 and 2 are provided with gliding surfaces 14 and 15. The tips 17 of the stems 11 glide upon these surfaces 14 and 15 of the plates 1 and 2 whenever the latter are axially displaced relative to each other, for example from the position shown in Figure 2 to the position shown in Figure 3 and vice versa.

The strength, the resiliency and the tension of the springs are adapted to the particular use and the conditions of the V-belt and the load applied thereto, and are so adjusted that the belt, for example the belt 8, transmits the power applied thereto without slipping.

The centering means in the embodiment just described consist of the lugs 12 with the intermittent portions having been punched out. It is, however, also possible not to punch out these intermittent portions and to equip one of the support rings with centering means by producing incisions at the periphery of the support ring. There are thus created lugs between the stems 11 as well as in the area of the base of the stem. The lugs in the area between the stems 11 are sharply bent towards the second support ring whereas the intermittent lugs are bent in such a manner that they conform to the contours of the respective bases of the adjoining stems.

The fact that the stems and the support rings forming one plate spring are separately punched out brings about a number of considerable advantages.

The fingers can be punched out of a comparatively small steel band of even strength and elasticity. The fingers thus obtained are very homogeneous and will not break as easily as the stems of plate spring produced out of one piece of material. There is practically no waste of material since a steel band of very small width, i.e. a width equal to the width of the stems is sufficient.

The support rings are also separately produced and they can therefore have a greater strength than the stems and consequently a second abutment can be dispensed with.

It is also possible to have stems of varying strength and elasticity, and the number of stems in any given plate spring can be varied at will. Furthermore, the assembly of the elements as well as their mutual attachment is extremely simple.

The centering means are very simple yet sufficient to position the stems in their predetermined, equidistant relative positions.

It will be understood that this invention is susceptible to modification in order to adapt it to different usages and conditions, and, accordingly, it is desired to comprehend such modifications within this invention as may fall within the scope of the appended claims.

What I claim is:

1. In an adjustable V-belt pulley comprising central shaft means and a pair of conically shaped plates which are arranged on said shaft means and which are axially displaceable relative to each other, a spring device acting against at least one of said plates and comprising, in combination: a plurality of elongated spring strips emanating radially from said shaft means and being circumferentially equidistantly spaced, the inner end of each spring strip being in the region of said shaft means and the outer end of each spring strip being in engagement with said one plate, said spring strips in the region of their inner ends lying in the same plane; first and second support rings encompassing said shaft means, said first support ring abutting one side of said spring strips in the region of their inner ends and said second support ring abutting the opposite side of said spring strips in the region of their inner ends, one of said support rings being formed with a plurality of circumferentially equidistantly spaced axially extending lugs which project between adjacent spring strips; and means fastening each spring strip, in the region of its inner end, to both of said support rings at a single spot, whereby said spring strips are securely clamped between said first and second support rings and the radial alignment of said spring strips is maintained by said axially extending lugs of said one support ring.

2. A device as defined in claim 1 wherein said spring strips are fastened to said support rings by rivets.

3. A device as defined in claim 1 wherein said spring strips are fastened to said support rings by spot welding.

References Cited in the file of this patent

UNITED STATES PATENTS

| | | |
|---|---|---|
| 1,373,707 | Bennett | Apr. 5, 1921 |
| 2,050,358 | McElroy | Aug. 11, 1936 |
| 2,478,289 | Lemon | Aug. 9, 1949 |